Nov. 7, 1961 D. J. MUNSON 3,007,709
COLLAPSIBLE UTILITY CART
Filed March 15, 1957 3 Sheets-Sheet 1
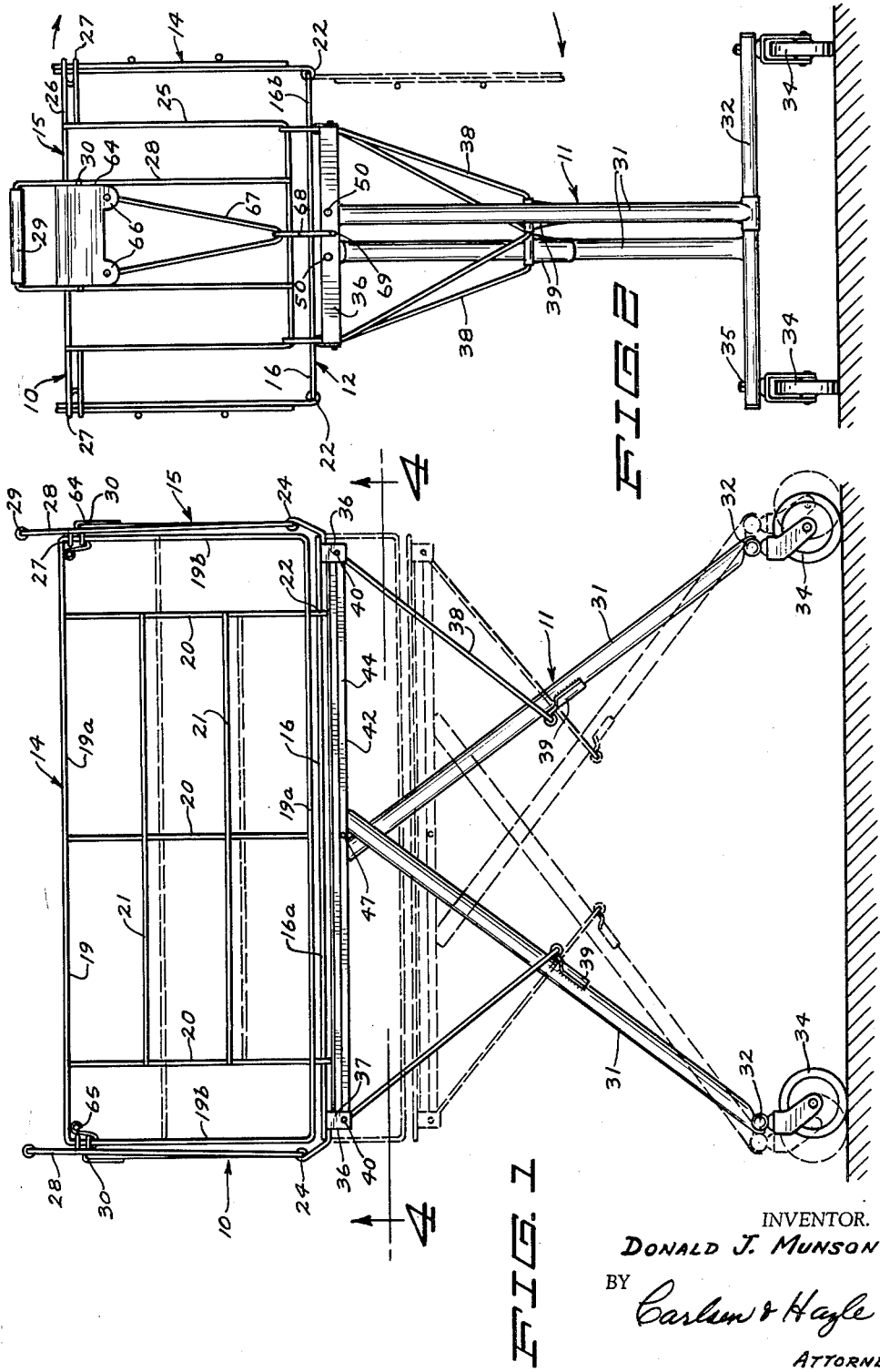
INVENTOR.
DONALD J. MUNSON
BY
ATTORNEYS INVENTOR.
DONALD J. MUNSON
BY
Carlsen & Hagle
ATTORNEYS

INVENTOR.
DONALD J. MUNSON
BY
ATTORNEYS

United States Patent Office 3,007,709
Patented Nov. 7, 1961

3,007,709
COLLAPSIBLE UTILITY CART
Donald J. Munson, Minneapolis, Minn., assignor to The J. R. Clark Company, Spring Park, Minn., a corporation of Minnesota
Filed Mar. 15, 1957, Ser. No. 646,258
8 Claims. (Cl. 280—36)

This invention relates to collapsible portable basket type containers and particularly to such containers having an attached supporting leg structure such as a laundry cart.

The primary object of the invention is to provide a utility cart adapted for transporting laundry or the like having a container and a collapsible leg structure therefor, and having convenient releasing controls whereby the collapsed leg structure may be readily unlocked as the container is carried to permit the structure to automatically drop to a fully extended position under the container to support the same.

Others in the art have provided collapsible understructures for laundry carts. However, these have generally proven unsatisfactory as far as providing both a sturdy broad based leg support and one which is flatly collapsed to a completely out-of-the-way position against the underside of the basket and within the proximate limits thereof. Normally such heretofore known understructures have embodied a pair of leg units which are pivotally interconnected for relative folding movement between erect and collapsed conditions, the units having their upper ends slidably pivoted to the underside of the laundry hamper or basket. While this construction facilitates collapsibility, the pivotal interconnection of the leg units by its very nature demands a spreading of the leg unit lower ends during the collapsing operation thus prohibiting in one structure both maximum floor contact when erected and minimum lateral extension when collapsed.

Accordingly, another object of the invention is to provide a supporting structure for a laundry basket or the like adapted to be collapsed and locked against the basket bottom for convenient manual transport of the basket and wherein said structure is so designed as to preserve a relatively constant spread between the floor contacting portions thereof as the structure is moved between collapsed and erected conditions.

Another object of the invention is to provide a laundry cart or like device having a basket and supporting leg structure wherein the leg structure is adjustable between different heights to support the basket at any preselected one of a plurality of different elevations.

Still another object of the invention is to provide a laundry cart or the like having a collapsible leg structure with a manually releasable locking mechanism, wherein the locking mechanism has a safety catch to prevent complete collapse of the leg structure in the event of accidental release thereof.

Still another object of the invention is to provide a laundry cart or the like having a container and a leg structure both of which are completely collapsible for storage and shipping of the cart and wherein the leg structure collapses almost completely within the horizontal dimension of the container.

A still further object of the invention is to provide a new and improved laundry cart having an upwardly opening container wherein the side walls of the container may be singly lowered for lateral access to the container.

With these objects in view the invention broadly comprises a basket having a bottom and side walls, the side walls being hinged to the bottom wall for collapsing thereagainst, a pair of leg units arranged in longitudinally crossing relation under the basket and having their upper ends slidably pivoted on parallel paths to the underside of the basket for collapsing of the leg units against the underside of the basket, a latching member pivoted to the underside of the basket and adapted to lock the upper ends of the leg units at various positions, spring means yieldably holding the latching member in a locking position, and a latch control connected to the latching member and extending upwardly along the side of the basket for manually pivoting the latching member to a release position.

The above mentioned and still additional objects of the invention will be brought to light during the course of the following specification, reference being made to the accompanying drawings, in which:

FIG. 1 is a side elevation of a laundry cart embodying the present invention with the leg structure in fully erected condition for highest elevation of the container. A secondary or intermediate erected position of the cart is shown in broken lines.

FIG. 2 is an end elevation of the cart in fully erected condition and showing, in broken lines, one side wall of the container opened to a downwardly hanging position.

Figure 3:
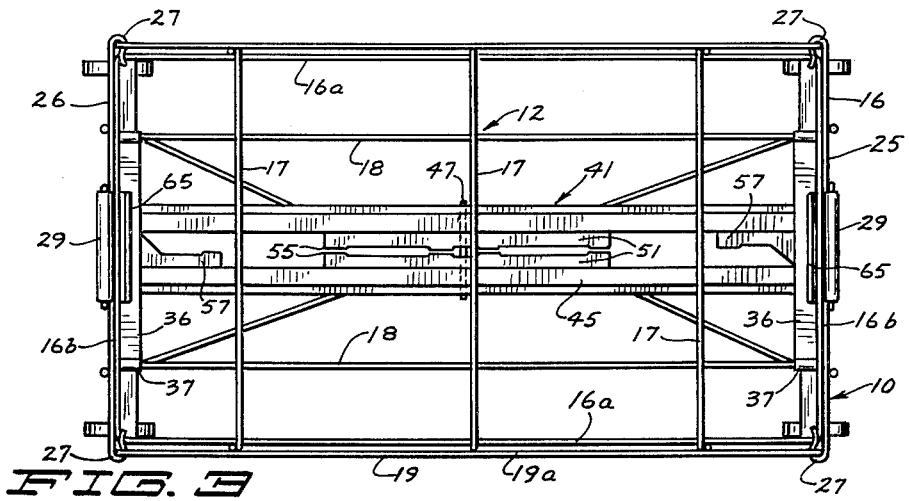
FIG. 3 is a plan view of the cart in erected condition.

Referring now more particularly to the drawings reference numerals will be used to denote like parts and structural features in the different views. In the drawings the invention is shown as being incorporated in a laundry cart or hamper such as is normally used to hold articles of clothing and transport them at various times during the processing thereof through domestic laundering, drying, and ironing operations. It will be understood, however, that the structure disclosed is readily adaptable to use in other types of carts or stands particularly where collapsibility and positive locking of the supporting structure against the underside of the carrier are desirable features.

The cart shown broadly comprises a basket or container, denoted generally at 10, and a supporting leg structure for the container denoted generally at 11. The basket 10 will first be described in detail. It has a bottom wall 12 and four upstanding side walls designated as side walls 14 and end walls 15 all of which have a wire frame construction. The walls 14 and 15 are hingedly connected to the bottom wall and are interlocked near their upper edges for conversion between their upstanding positions and collapsed or folded positions over the bottom 12.

Bottom wall 12 comprises a continuous rectangularly shaped marginal member 16 which has its longitudinal portions 16$^a$ connected by transverse wires 17 which are spaced along the bottom with the ends thereof welded to the portions 16$^a$. The transverse portions 16$^b$ of frame 16 are interconnected by a pair of longitudinally extending wires 18 which are welded to the portions 16$^b$. Wires 18 cross the wires 17 and are preferably welded thereto at their points of crossing to give the bottom 12 a rigid construction.

Side walls 14 each comprise a length of wire 19 bent in a continuous rectangular shape to form a frame substantially equal in length to the bottom 12. This frame has opposing longitudinal portions 19a connected by wires 20 and end portions 19b. Wires 21 lying parallel to portions 19a interconnect the cross members 20 to present a rigid side wall for the basket. The endmost members 20 have loops 22 therein adjacent the bottom 12 which encircle the bottom wire portions 16a to provide a hinge connection between the walls 14 and 12.

The longitudinally extending wires 18 project beyond and upwardly from the bottom portions 16b at each end of the bottom with loops 24 formed in the terminals thereof (FIG. 1). These loops which are present in pairs at each end of the basket serve as hinge means for the basket end walls 15. A U-shaped wire member 25 has its bight portion journaled in the set of loops 24 with the parallel end portions of member 25 extending upwardly therefrom. A wire catch bar 26 extends across and is connected to the distal ends of member 25. This bar, as best shown in FIGS. 2 and 3, is formed of a single length of wire with the end portions thereof turned back upon themselves and with the terminals thus formed bent to provide inwardly opening hooks or catches 27 adapted to engage and releasably hold the portions 19b of the adjacent side walls 14. The opening in each catch 27 is slightly narrower than the wire 19b to yieldably retain the wire in the catch. Accordingly, when the wire portions 19b are locked in the various catches 27 the walls 14 and 15 are interlocked in vertical or upstanding position. An inverted U-shaped member 28 is mounted centrally on each end wall 15 to brace the wall frame and provide a carrying handle. This member projects substantially above the member 26 with the bight portion thereof carrying an enlarged gripping element 29 which is spaced sufficiently from bar 26 to allow the hand of the operator to firmly grip the element. The handle member also carries a transverse rest 30 which is parallel to but spaced slightly below the bar 26. The purpose of rest 30 will be subsequently explained.

As thus far described the walls 12, 14 and 15 of the basket 10 are formed of wire sections all of which are preferably of a uniform gauge. It will be understood that each wall is structurally rigid while yet being of skeleton construction so as to be durable while extremely light in weight.

The supporting structure 11 for the basket 10 broadly comprises a pair of leg members 31 lying in adjacent longitudinal planes through the basket. Each leg 31 has a transversely extending foot 32 integrally attached to its lower end and each foot carries a pair of spaced caster wheels 34 which are mounted in yokes having swivel movement about the axis of spindles 35 journaled in the foot 32.

The means of attaching legs 31 to the basket 10 will now be described. A pair of elongated bracket members 36 of channel construction are mounted in inwardly facing position one at each end of the bottom 12. These brackets extend transversely and are attached to hang from the bottom 12 by means of small attachment straps 37 which are riveted to the ends of the brackets and extend over and around the wires 18 in the bottom 12 (FIGS. 1, 2 and 3). A generally V-shaped bracing rod 38 connects each leg 31 to the adjacent bracket 36. This rod has a blunt apex portion which is journaled in a strap hinge member 39 mounted in relatively central position along leg 31. The legs of brace 38 diverge from hinge 39 and are pivoted as at 40 on a common axis to the ends of bracket 36.

The upper ends of legs 31 are connected to the underside of basket 10 for longitudinal sliding movement therealong. This is accomplished by providing a slide, designated generally at 41, to extend longitudinally in a transversely centered position along the underside of bottom 12. The cross sectional construction of the side is shown best in FIG. 8. It has a pair of transversely spaced slide members 42 which extend the length of the bottom with their ends rigidly secured to the brackets 36. Each member 42 which is formed of rigid sheet material has a longitudinally extending slide channel 44 having an upwardly offset mounting flange 45. The end portions of flange 45 and the lower wall of channel 44 fit snugly within and are spot welded or otherwise secured to the walls of brackets 36. The opposing slide channels 44 thus form a slideway spaced slightly below the bottom wall of the basket 10.

Figure 4:
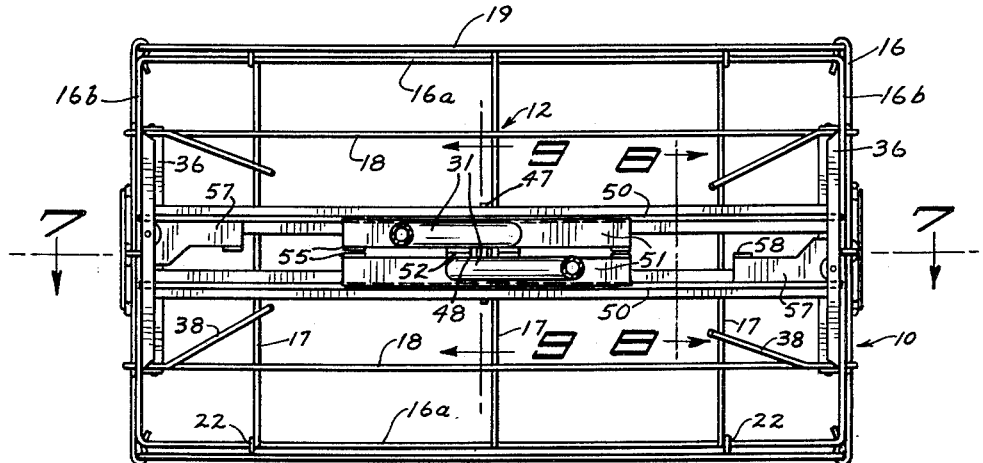
FIG. 4 is a view of the container from the underside taken through the leg structure along the line 4—4 in FIG. 1.

A stop pin 47 (FIGS. 4 and 7) is mounted crosswise of the slide 41 having its ends mounted in the opposing channels 44. This pin is located at the longitudinal center of the slide. Each leg 31 has a mounting pin 48 secured transversely on the bottom wall side of the upper end thereof with the ends of the pin slidably seated in channels 44. So mounted the upper ends of the legs 31 are slidable along the slide 41 with each leg depending from the respective pins 48 for permitting complete collapsing of the legs against the slide 41 as will become apparent. The pin 48 on each leg is mounted in the slide on the side of pin 47 opposite from the direction of extension of the leg. Pin 47 being disposed across the path of the slide accordingly prohibits movement of either pin 48 past the center line.

Figure 5:
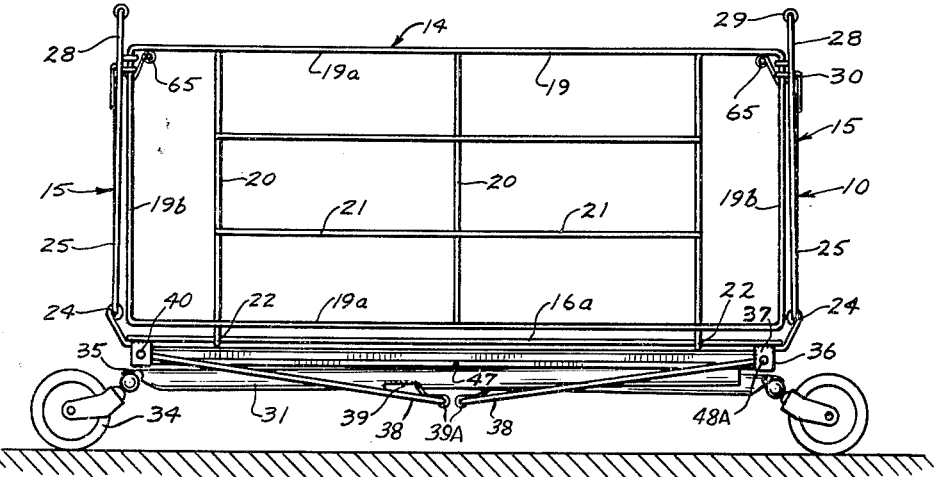
FIG. 5 is a side elevation of the cart with the leg structure collapsed and locked against the bottom of the container.

It will now be understood that the leg 31 may be freely folded and erected between the positions shown in FIGS. 1 and 5. In FIG. 5 the legs are collapsed against the bottom. As the basket 10 is raised the wheels 34 will remain in contact with the floor by gravity and the slidable elements 48 at the upper ends of the legs will move inwardly until they contact pin 47 with the legs in erect downwardly spreading condition as shown in FIG. 1. Braces 38 will, of course, swing downwardly about pivots 40 as the legs move to their erect condition.

Figure 7:
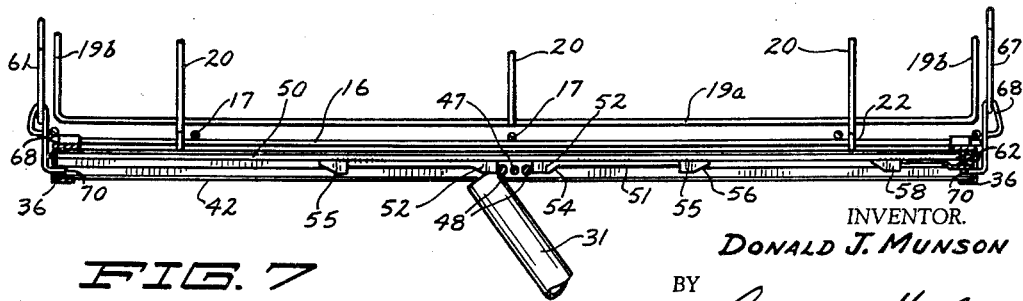
FIG. 7 is a longitudinal vertical section through the bottom of the container taken along line 7—7 of FIG. 4.

A means for locking the leg structure at various positions will now be described and for a clear understanding of the construction attention is directed to FIGS. 3, 4, 7 and 8. A pair of hinge rods 50 extend longitudinally one along each slide member 42 immediately below flange 45 with the ends thereof journaled in brackets 36. Each of the rods 50 carries an elongated catch plate 51 which is centered on the rod and integrally attached thereto. Each plate 51 has a pair of center teeth 52 which are spaced longitudinally of the plate and which project downwardly one on each side of pin 47. The facing edges of teeth 52 are vertical, as best shown in FIG. 7, and are spaced apart sufficiently to allow the reception of pins 48 therebetween one on each side of the stop 47. The remote edges of teeth 52 are beveled as at 54.

Figure 9:
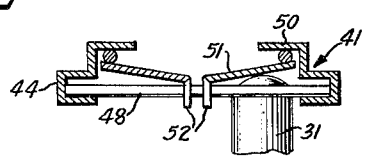
FIG. 9 is an enlarged fragmentary transverse vertical section through the longitudinal central slide portion taken on line 9—9 of FIG. 4.

At their outer ends spaced substantially from teeth 52 the plates 51 are provided with downwardly projecting teeth 55 which also face inwardly having their outer lower edges beveled as at 56. Near one end and at opposite ends of the basket each rod carries a latch member 57 in the form of a plate lying substantially on the plane of member 51. Each member has a tooth 58 projecting downwardly between the channels 44. The teeth 58 have inwardly facing beveled edges 58A for permitting the respective outwardly moving catch pins 48 to automatically pass thereover. The outer end portion of member 57 lies between the upper and lower walls of bracket 36. This portion has an upwardly opening seat 59 stamped therein with an aperture 60 centered in the seat. A fixed pin 61 mounted on bracket 36 extends through the opening 60 and carries a spiral spring 62 held under compression between the upper wall of bracket 36 and member 57 the lower end of the spring resting in seat 59. The spring 62 accordingly biases member 57 and plate 51, through rod 50, toward a downward or locking position. As best seen in FIG. 9 each latch member's respective depending teeth 52 extend well beyond the transversely extending pin 48 from the latch member when in the downward or locking position. Only when both teeth 52 respectively on the two members 51 have been moved upwardly clearing the pin 48 will the legs 31 be subject to any spreading movement toward the collapsed position.

Figure 8:
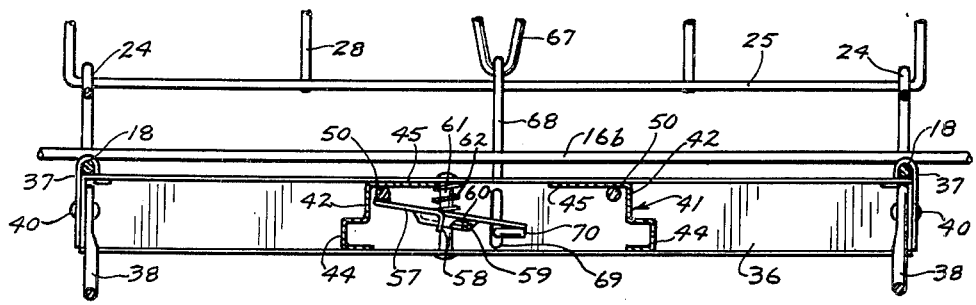
FIG. 8 is an enlarged fragmentary section through the central portion of the container bottom taken on line 8—8 of FIG. 4.

A mechanism for swinging members 57 and 51 to an upper or release position is mounted on each end wall 15 of the basket. These are identical and only one will be described. A control member 64 formed of sheet metal is configured to hook over the rest 30 to set thereon, then extend under the bar 26 and upwardly inside the upper portion of handle 28 with the inner edge thereof curled as at 65. The rolled portion 65 presents a gripping edge for the control spaced inwardly and slightly below the element 29. The other end of member 64 hangs downwardly from rest 30 and has a pair of spaced ears 66 to which are connected the upper ends of a V-shaped pull rod 67. An actuator hook 68 is flexibly attached to and hangs downwardly from the apex of rod 67 and projects through a vertical slot 69 in bracket 36 with a terminal finger portion 70 lying under the distal edge portion of latch 57 (FIG. 8). The control member 64 is allowed limited vertical play between the bar 26 and rest 30. It will be understood that as upward pressure is exerted upon edge 65 the control 64 will be elevated pulling member 68 upwardly in slot 69 with finger 70 swinging plates 57 and 51 to a raised position about the axis of rod 50 and against the compressive force of spring 62. When the members 51 and 57 are raised the various teeth 52, 55 and 58 are raised from the space between the opposing channels 44. Of course, when members 64 are released the latch plates will return to their lowered or biased positions.

The manner of use of the invention will now be clearly understood. When the cart is in the condition shown in FIG. 1 it provides a wheeled carrier for transporting items between stations during the laundering operation. The basket 10 is supported above the floor at a convenient elevation for a person who is emptying or filling the basket from a standing position. Casters 34, of course, allow the cart to be freely pushed or pulled along the floor.

The leg structure 11 in its erected condition does on occasion, however, provide an obstacle to convenient transport of the basket. This generally arises when the operator wishes to transport the basket up or down steps. It is accordingly desirable that the leg structure be readily collapsible against the underside of the basket. In the present invention such collapsing is readily and easily accomplished. The operator merely grips the lifting handles 29 and exerts upward pressure with the thumbs on the lips 65 of controls 64. This raises the latch elements 51 sufficiently to free the pins 48 from teeth 52 allowing the pins to gravitationally slide outwardly along channels 44 in a leg collasping direction. The latch releasing position of control 64 is maintained until pins 48 have passed teeth 55. The pins 48 will automatically pass over the end teeth 58 and be locked therebehind, with the legs 31 in completely collapsed position as shown in FIG. 5. Inasmuch as the legs 31 are offset transversely and since the pivots 39A are respectively slightly closer to the upper leg ends the cross members 32 lie beyond the upper end of the opposing legs when collapsed the two legs may be folded into a substantially common plane lying immediately below the slide 41. The longitudinal spacing between the brace other end pivots 40 taken parallel to a wire 18 is preferably greater than the total distance on one leg structure taken between the brace 38 end pivots at 40 and 39A, which is preferably less than one-half the spacing between pivots 40, plus the distance from the pivot 39A to the leg 31 upper end slidable pivot formed by the pin 48 riding in the slide 41. As a result the legs 31 and braces 38 are collapsible flat against the slide 41 because the leg upper end pin 48 longitudinal travel is not limited by the bracket 36. It is also important to note that with the relative independence of legs 31 and the bracing structure 38 there is very little spreading of the leg lower ends as they move into their collapsed position. This feature assures broad base contact with the floor while yet allowing the legs to come within the horizontal limits of the basket bottom when collapsed, only the casters projecting therebeyond.

When the leg structure has been collapsed and locked in the manner described to the condition shown in FIG. 5, the operator can easily carry the unit by handles 29 with the collapsed leg structure being completely out of the way.

To again erect the leg structure the operator merely again raises controls 64 while manually supporting the basket 10 in an elevated position. The leg mounting pins 48 will be released from teeth 58 and the legs will swing downwardly to the floor with pins 48 riding over teeth 55 and 52 where they are locked between teeth 52 and stop 47. Spring 62, of course, returns the latch elements to a locking position promptly upon relief of upward pressure on control lips 65.

In the structure disclosed the basket may be selectively supported at a low erected position as shown in broken lines in FIG. 1. This position is maintained when the latch mechanism is operated to lock the pins 48 on teeth 55 rather than teeth 52, allowing a greater spread in the leg upper ends. Obviously it is possible to provide several additional teeth along the plate 51 for adjustment of the device to various other elevations. The lower erected position is here designed to place the basket at a convenient height for access from a seated position.

It will be observed that both rods 50 carry plates 51 and 57 with the various locking teeth described. Accordingly, there is a double lock on each pin 48 in each position. This is a safety feature which eliminates accidental tripping of the control 64 to collapse the legs. The double latch does not materially increase the effort of operation as both handles 29 are normally gripped anyway during the raising or lowering of the basket.

The link 68 is looped around the apex of member 67 to provide a flexible connection for folding of the latch control over the basket bottom with the end wall.

It may on occasion be desirable to use the cart as a shelf from a seated position such as when the operator is ironing, and removing items from or placing them upon the bottom 12. This may be accomplished by releasing one of the side walls 14 and allowing it to hang downwardly as shown in broken lines in FIG. 2.

Figure 6:
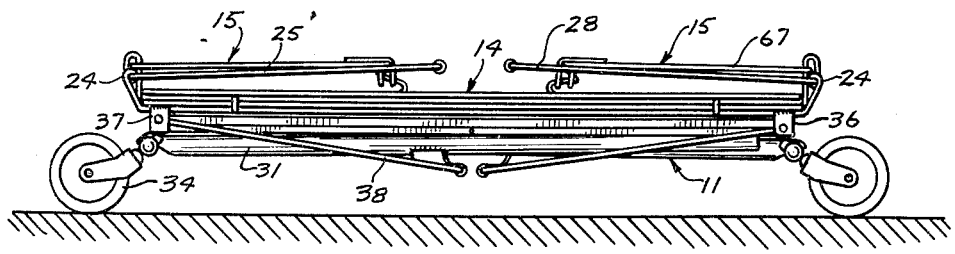
FIG. 6 is a side elevation of the cart with both the container and the leg structure in collapsed condition.

When the cart is to be shipped or stored the legs are collapsed and the side walls 14 and end walls 15 are folded inwardly over the bottom as in FIG. 6.

The cart construction disclosed accordingly economically and effectively carries out the aforementioned objectives. It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a utility cart a basket and a supporting structure for the basket comprising an elongated slide, means for mounting the basket on the slide with the slide extending horizontally under the bottom of the basket, a pair of leg members disposed in downwardly intercrossing relation under the slide with the upper ends slidably pivoted thereto for relative spreading and closing movement along the slide between an erect condition and a collapsed condition of the leg members against the slide, an elongated latch element mounted on the slide to extend therealong and movable between locking and releasing positions, said element having inner and outer pairs of latch teeth engageable with the leg pivots to lock them against sliding movement respectively with the legs in erected or collapsed conditions, the inner pair of teeth having beveled remote edges and the outer pair of teeth having beveled facing edges allowing the leg pivots to slide inwardly over the former and outwardly over the latter.

2. In a utility cart a basket having a rigid bottom, a pair of side and a pair of end walls hinged to the bottom for folding thereagainst to a collapsed position, said end walls having handles thereon for manual lifting of the basket, a supporting structure mounted on the basket bottom and convertible between an erected condition and a collapsed condition against the bottom, said structure including latch means for locking the structure in said conditions, a latch control element mounted on one end wall for vertical sliding movement and having a manual actuating portion disposed adjacent the lifting handle thereon for single handed operation of the lifting handle and control element, and link means extending along said one end wall and connecting said control element to the latch means, said link means including a hinge on said one end wall hinge axis for folding of the link means with said one end wall against the bottom.

3. In a utility cart, a receptacle, and a supporting structure for the receptacle comprising an elongated slide extending horizontally under the receptacle and attached thereto, a pair of leg units extending downwardly under the slide in intercrossing relation and having their upper ends slidably pivoted on opposite sides of the longitudinal center of the slide for relative spreading and closing movement along the slide to move the leg units between an erect condition and a collapsed condition against the slide, a catch at the upper end of each leg unit adjacent its pivot to move in a common horizontal path with the other catch during said spreading and closing movement, an elongated latch member extending along the slide and movably mounted thereon for raising and lowering movement of at least a longitudinally extending portion thereof, said moveable latch portion carrying a plurality of pairs of latch teeth, the teeth in each pair being equally spaced from the longitudinal center of the slide on opposite sides thereof and said pairs being spaced at varying distances from said center, said teeth disposed to move into and out of the horizontal path of the catches to lock the leg unit upper ends at various positions against sliding movement, each of said teeth having one latching edge generally perpendicular to said path for locking engagement with a catch and its opposing edge beveled to allow the catch to slide thereover toward said latching edge, and all of said teeth excepting those in the outermost pair having their latching edges facing inwardly toward the longitudinal center of the slide.

4. In leg structure for a utility cart having a bottom wall, a pair of mutually independent leg members arranged to cross longitudinally under the bottom wall with the upper ends thereof slidably pivoted to the bottom wall and the lower ends including transversely extending feet for supporting spaced apart floor engaging members, each leg having a brace member pivoted thereto at a medial point slightly closer to the slidable pivot than the transverse foot and the brace other end being pivoted to the bottom wall adjacent end in substantial horizontal alignment with the slidable pivot, the distance taken along a verical longitudinal plane in one leg from the longitudinal end pivot through the medial pivot is not greater than one-half the horizontal distance between the longitudinal end pivots, and the legs being collapsible such that the transverse foot is longitudinally outward of the other leg upper end and the legs are substantially horizontally aligned adjacent the bottom wall.

5. Leg structure for a utility cart having a bottom wall and comprising a pair of mutually independent leg members arranged to cross longitudinally under the bottom wall with the upper ends thereof slidably pivoted in a common channel on the bottom wall and the lower ends including transversely extending feet for supporting depending floor engaging members, an inverted V-brace having a blunt apex pivotally connected at a medial point to each leg member at a point closer to the slidable pivot than the transverse foot and extending in diverging relation to transversely spaced apart pivots on the adjacent end of the bottom wall in substantial horizontal alignment with the slidable pivot, the distance taken along a longitudinal vertical plane of one leg structure from the longitudinal end pivot to the medial point pivot being not greater than one-half the horizontal distance between the longitudinal end pivots, and the legs being collapsible against the bottom wall whereby the feet are longitudinally outside the other leg upper end and the leg members are nesting in the V-braces in substantial horizontal alignment with each other and the floor engaging members are in oblique floor engaging position.

6. A collapsible leg structure for a laundry basket having opposing lifting handles comprising a pair of downwardly intercrossing structurally independent leg units having a catch element on their respective upper ends with each catch element extending transversely beyond both leg unit upper ends, a longitudinally extending slide member having facing transversely spaced apart grooves respectively slidably receiving the catch elements opposing ends for permitting the legs to move in spreading and closing movements, two independent latch means mounted on the slide, each latch means having a plurality of latch teeth formed in pairs with each pair consisting of one tooth on opposing sides of the basket longitudinal center, the tooth pairs in each means being transversely aligned with like tooth pairs on the other means with one tooth pair being for holding the legs against spreading and another tooth pair being for holding the legs against closing movements, and two independent controls respectively mounted adjacent a lifting handle and being operatively connected respectively to the latch means for moving the latch teeth away from the catch elements whereby both controls must be simultaneously operated for permitting any spreading or closing leg movements respectively from the said one and another tooth pairs.

7. In a utility cart, a basket and a supporting structure for the basket comprising an elongated slide extending horizontally under the basket and attached thereto, a pair of structurally independent leg members disposed in downwardly intercrossing relation under the slide with the upper ends of the leg members slidably pivoted in the slide for relative spreading movement along the slide to move the leg members from an erect condition to a collapsed condition against the slide, a pair of elongated latch members mounted on the slide in parallelism therealong with each latch member having pairs of latch teeth, each pair consisting of two teeth respectively on opposing sides of the slide longitudinal center, the teeth in each latch member being transversely aligned with the other latch member teeth, transversely extending catch means on each leg member upper end for respectively engaging both teeth on one side of the slide longitudinal center in transversely aligned pairs of teeth, control means on each of two opposing sides of the basket and each being operatively connected to one of the latch members whereby both controls must be simultaneously operated to permit any relative spreading movement of either leg member.

8. In a utility cart, a supporting leg structure comprising an elongated slide at the leg structure upper end portion, a pair of leg units arranged in downwardly intercrossing relation and each leg having transversely extending catch means slidably connecting each leg unit to the slide for relative spreading and closing movement of the leg units, two independently releasable locking means on the slide and each having pairs of depending teeth with the teeth in each pair being spaced an equidistance on opposing sides of the slide longitudinal center, the teeth pairs on each locking means being transversely aligned with the other locking means teeth pairs, one of the pairs of each locking means being for holding the leg units against relative spreading movement, and the catch means of each leg unit engaging both the locking means aligned teeth in any pairs of teeth whereby in the said one of the pairs both locking means must be simultaneously released before either one of the leg units is subject to relative spreading movement.

References Cited in the file of this patent

UNITED STATES PATENTS

| | | | |
|---|---|---|---|
| 631,556 | Bushnell | Aug. 22, | 1899 |
| 1,881,047 | Doman | Oct. 4, | 1932 |
| 1,895,290 | Lobel | Jan. 24, | 1933 |
| 2,102,959 | Kennedy | Dec. 21, | 1937 |
| 2,492,676 | Zajicek | Dec. 27, | 1949 |
| 2,531,856 | Marcouiller | Nov. 28, | 1950 |
| 2,546,097 | Hild | Mar. 20, | 1951 |
| 2,692,807 | Cordola | Oct. 26, | 1954 |
| 2,788,252 | Davis | Apr. 9, | 1957 |

FOREIGN PATENTS

| | | | |
|---|---|---|---|
| 102,173 | Switzerland | Nov. 16, | 1923 |